HYBRID BRIDGE FOR APPLYING TWO SOURCES, WITHOUT INTERACTION, TO COMMON LOAD, ALL THREE BEING UNBALANCED AND HAVING COMMON GROUND

Filed Feb. 7, 1963 3 Sheets-Sheet 1

INVENTOR
Werner Buschbeck

BY Spencer & Kaye
ATTORNEYS

INVENTOR
Werner Buschbeck

BY Spencer & Kaye
ATTORNEYS

INVENTOR
Werner Buschbeck

BY Spencer & Kaye

ATTORNEYS

United States Patent Office 3,247,471

Patented Apr. 19, 1966

3,247,471

HYBRID BRIDGE FOR APPLYING TWO SOURCES WITHOUT INTERACTION TO COMMON LOAD, ALL THREE BEING UNBALANCED AND HAVING COMMON GROUND

Werner Buschbeck, Ulm (Danube), Germany, assignor to Telefunken Patentverwertungs-G.m.b.H., Ulm (Danube), Germany Filed Feb. 7, 1963, Ser. No. 257,039

Claims priority, application Germany, Feb. 9, 1962, T 21,574; Oct. 23, 1962, T 22,906

29 Claims. (Cl. 333—11)

The present invention relates to a circuit arrangement for feeding a common load by means of two high-frequency generators whose output voltages have the same frequency and which bear a predetermined phase relationship with respect to each other, in which circuit there is an alternating current bridge for decoupling the generator outputs from each other.

The term "high-frequency generator," as used throughout the instant specification and claims, is deemed to include any source of high-frequency electrical energy, including, for instance, the output of a power amplifier.

Existing circuits of this type, in which if one generator fails, the other continues to operate, are based on the transformation characteristics of λ/4 or λ/8 lines, or their quasi-static equivalent circuits. Consequently, if there is a change-over from one generator to the other, at least four places, namely, the individual bridge arms, have to be tuned. If the so-called quasi-static equivalent circuit is used, six or eight places have to be tuned.

It is, therefore, an object of the present invention to provide a circuit arrangement in which an ordinary A.C. bridge circuit is used for connecting two high-frequency generators in parallel with a common load impedance, in which no power is lost in the load balancing or compensating resistor, and which bridge circuit is able to operate over a wide frequency range, without there being any variable elements which have to be tuned.

There should, within the above-mentioned wide frequency range, be sufficient decoupling between the outputs of the two generators, as well as good matching of the input resistances appearing at the input terminals of the arrangement with respect to the nominal ohmic value. Furthermore, in normal parallel operation of the two generators, the sum of their power outputs should be applied to the common load impedance, or under special circumstances, the power output should be applied to two equal output resistors while the load balancing or compensating resistor, or in the special case, both load compensating resistors, remain practically currentless.

In the electrical measurement art, there exists a circuit arrangement derived from the Wheatstone bridge in which two adjacent branches or arms of the bridge contain ohmic resistors while the two other arms contain two similar reactances. Such a bridge circuit, known as a Schering bridge, is used primarily for measuring inductances and capacitances. One bridge diagonal has an alternating voltage applied to it, there being a meter arranged across the other bridge diagonal for reading out the null. See Feilhauer, "Die Fernmeldetechnik," Fachbuchverlag Dr. Pfanneberg & Co., Giessen, pages 904 and 905, FIGURES 1636 and 1637.

Many bridge circuits were examined with the hope of fiinding one suitable for connecting two high-frequency generators in parallel, and one of the bridge circuits considered was the above-mentioned Schering bridge. This circuit has heretofore not been used for connecting high-frequency generators in parallel, probably in view of the fact that of the two generator voltages applied across the bridge diagonals, only one terminal of one voltage could be grounded, so that both output terminals of the other generator would be at a potential with respect to ground (either true ground or the chassis of the instrument).

The Schering bridge circuit was found, insofar as its use for connecting high-frequency generators in parallel is concerned, to have the notable advantage that its tuning is independent of frequency. It was therefore anticipated that the mutual decoupling of the two generator outputs could be maintained over a wide frequency range. Accordingly, experiments were conducted to find a circuit arrangement based on the Schering bridge, in which the natural advantage of such a bridge, namely, the possibility of obtaining a decoupling which is independent of the frequency, was preserved while the drawback of other bridge circuits, namely, the fact that the two output terminals of one of the two high-frequency voltages could not be grounded, was avoided.

The present invention is thus based on a circuit arrangement for feeding a common load from two high-frequency generators whose output voltages are of the same frequency and bear a predetermined phase relationship to each other, which circuit arrangement incorporates an A.C. bridge for decoupling the generator outputs from each other, in which a first bridge point is connected (1) with one output terminal of the first generator, (2) with one terminal of a load resistor lying in an adjacent bridge arm, (3) with a load compensating resistor lying in the other adjacent bridge arm, and (4) with ground, while a second point which is diagonally opposite the first point is connected (1) with the other output terminal of the first generator, and (2) with one terminal of the reactive and/or resistive impedances contained in each of the two arms adjacent this second point. The output voltage of the second generator is applied across the remaining third and fourth points of the bridge. According to the present invention, the load resistor and the load compensating resistor, each being equal to R, each has a reactance or a combination of reactances connected in parallel with it, of which at least one is constituted by the outer conductor of a coaxial line, whose inner conductor is connected, at that end at which the outer conductor of the coaxial line is connected with the third (or fourth) point, with the fourth (or third) point, and, at the end of the coaxial line at which the outer conductor is grounded, with one output terminal of the second high-frequency generator. The other output terminal of this second generator is grounded.

Additional objects and advantages of the present invention will become apparent upon consideration of the following description when taken in conjunction with the accompanying drawing in which.

Figures 1, 2, 3, 4, 5, 6, 7, 8, 9, 10:
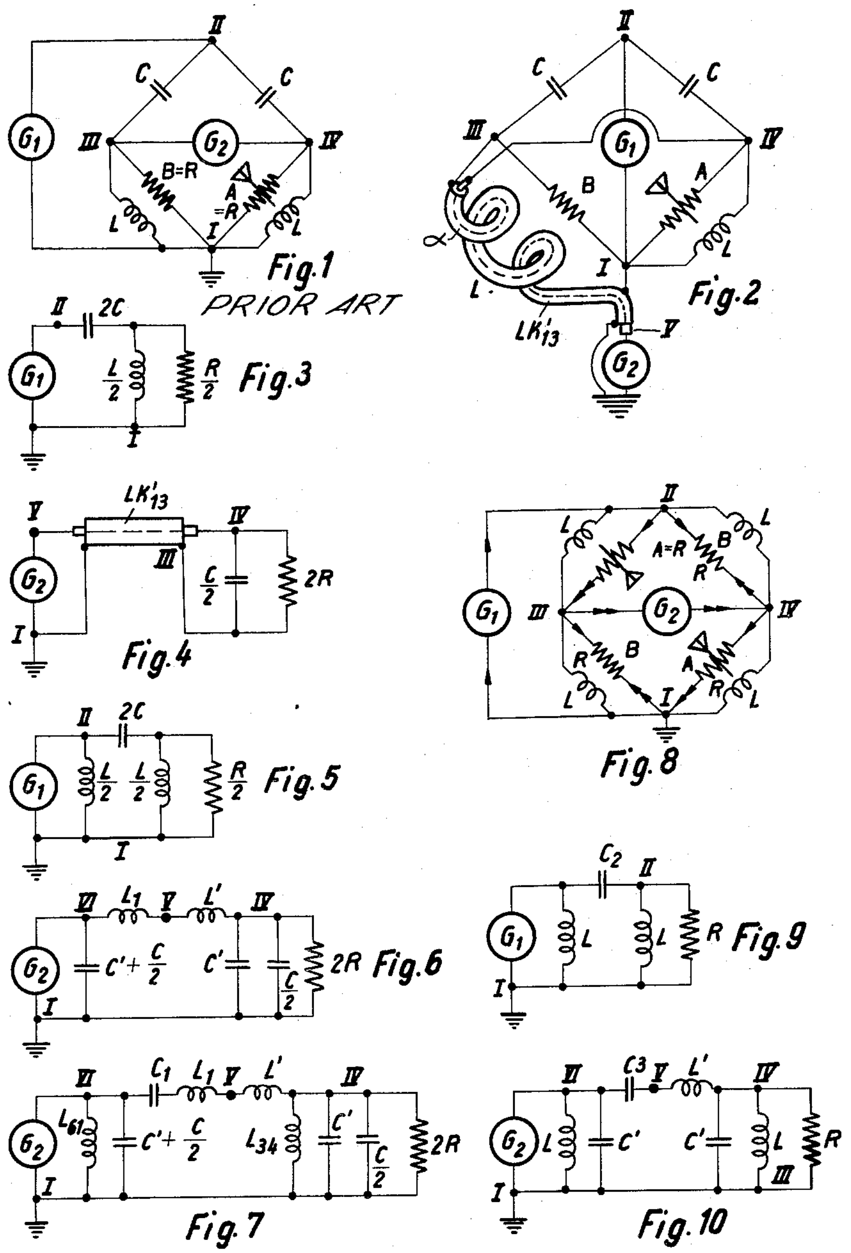
FIGURE 1 is a circuit diagram of a bridge on which the present invention is based.
FIGURE 2 is a circuit diagram of a bridge according to the present invention.
FIGURE 3 is an equivalent circuit appearing across points I and II of the bridge of FIGURE 2.
FIGURE 4 is an equivalent circuit appearing across points I and V of the bridge of FIGURE 2.
FIGURE 5 is an equivalent circuit similar to FIGURE 3 but showing the bridge circuit complemented by a shunt element to form a filter network.
FIGURE 6 is an equivalent circuit similar to FIGURE 4 but complemented by shunt and series elements to form a filter network.
FIGURE 7 is an equivalent circuit similar to FIGURE 6 but showing the bridge circuit complemented by shunt and series resonant circuits to form the filter network.
FIGURE 8 is a circuit diagram of another bridge circuit according to the present invention.
FIGURE 9 is an equivalent circuit appearing across points I and II of the bridge of FIGURE 8, complemented to form a filter network.
FIGURE 10 is an equivalent circuit appearing across points III and IV of the bridge of FIGURE 8, complemented to form a filter network.

Referring now to the drawings, and FIGURE 1 thereof in particular, the same shows the basic circuit diagram of a bridge on which the present invention is based. The two upper bridge arms are constituted by two similar and equal reactive impedances, shown here as capacitances C. The two lower bridge arms contain two resistances each equal to R, one of which is the load compensating resistor B and the other the common load resistor A. Each of the two resistances R has an inductance L connected in parallel with it. The first point of the bridge, indicated at I, is grounded. The output terminals of the first high-frequency generator $G_1$ are connected across points I, II, so that one terminal of this generator is obviously grounded.

The output terminals of the second high-frequency generator $G_2$ are connected across points III, IV, each of which points has a high-frequency potential with respect to ground. The common load resistance can, in practice, be constituted by the input resistance of an antenna, as indicated symbolically in FIGURE 1.

It has already been proposed to connect the high-frequency generator $G_2$, in the above-described circuit of FIGURE 1, by means of a so-called symmetry loop. The electrical midpoint of such a symmetry loop can then be grounded and the generator $G_2$ located on the non-symmetrical side of this loop can likewise have one of its terminals grounded. In such an arrangement, the symmetry loop acts as an inductance in the operating frequency range. The two halves of this loop, which constitute parts of the inductance, thus lie in parallel with the two ohmic resistances in the two lower arms. According to the present invention, however, the generator $G_2$ is connected not only so as to allow one side thereof to be grounded, but also to expand the field of applicability of the circuit in conjunction with medium, short and ultra-short waves, and, as will be shown later, so as to allow the circuit to use not only inductances but also other elements as the components which are connected in parallel with the ohmic resistances. According to the prior art, the voltages of the two generators $G_1$ and $G_2$ had to be phase-shifted by 45°, if the sum of their power outputs was to be applied to the output resistance A while the balancing resistance B was to remain currentless. According to the present invention, the bridge can be supplemented by adding circuit components to form a $\pi$-element which, in the operating range, is independent of frequency with reference to the connections of generator $G_1$.

FIGURE 2 shows how the inductance L of FIGURE 1 which lies across points I and II, is formed by the outer conductor of a coaxial line $LK'_{13}$, whose inner conductor is connected with point IV at that end of the line at which the outer conductor is connected with point III. At the other end of the coaxial line, the outer conductor is connected with point I and is grounded (thereby grounding point I), while the inner conductor is connected to a non-grounded terminal of generator $G_2$, whose other terminal is grounded. The length of the coaxial line $LK'_{13}$ is selected to be so small relative to a quarter wave length that, in the operating range of the arrangement, the outer conductor acts as an inductance. As is apparent from FIGURE 2, one terminal of each high-frequency generator is grounded, thereby retaining the advantage that the bridge is balanced independently of frequency, as a result of which the decoupling conditions are fully maintained.

The voltage of generator $G_2$ is applied across points III and IV, so that in this respect the arrangement of FIGURE 2 operates in the same manner as that of FIGURE 1. The inductance L connected in parallel with the compensating resistor is replaced by the inductance of the outer conductor of the coiled coaxial line $LK'_{13}$. No additional frequency dependency comes into play by applying the output voltage of generator $G_2$ across points III and IV, as would be the case, for example, if a symmetry transformer had been used for connecting the generator $G_2$. The input and output resistances of the coaxial line can be matched, and the only effect which this line has is that the phase of the voltage applied across points III and IV is delayed, by the electric length or phase or phase angle $\alpha$ of the coaxial line, with respect to the phase of the voltage put out the generator $G_2$. This can be compensated for such as by appropriately advancing the phase of $G_2$, or in some other manner, as will be explained below.

FIGURE 3 shows the equivalent circuit which appears between the points I and II, these being the points across which generator $G_1$ is connected. The parallel connection of the arms via points III and IV produces a series-circuit comprising a capacitance 2C and a two-branch parallel circuit, one of the branches being an inductance $L/2$ and the other a resistance $R/2$.

FIGURE 4 shows the equivalent circuit diagram appearing at points I and V, these being the points across which generator $G_2$ is connected. This generator is connected via the first coaxial line $LK'_{13}$ to the parallel circuit consisting of a capacitance $C/2$ and a resistance 2R. It is thus apparent that the operating impedances fed by the two generators are dependent on frequency and also that the magnitudes of their real, i.e., ohmic, components differ from each other.

FIGURE 5 shows that the bridge, whose load and compensating resistances each have an inductance L connected in parallel and whose arms adjacent point II are constituted by capacitances C, can be complemented to form a $\pi$-element which, in the operating frequency range of the first generator, is independent of frequency, by providing a shunt inductance $L/2$ connected across points I and II.

Similarly, FIGURE 6 shows that the bridge can be complemented to form a $\pi$-element which, in the operating frequency range of the second generator, is independent of frequency, by providing a series inductance $L_1$ between point V (which is the generator-end of the inner conductor of the first coaxial line $LK'_{13}$) and what is now the generator terminal VI, as well as a shunt capacitance $C/2$, augmented, if required, by a capacitance which represents the portion C′ of the capacitance of the equivalent circuit for the coaxial line $LK'_{13}$.

FIGURE 7 relates to the connection of generator $G_2$ and shows how a band-pass $\pi$-element can be obtained by complementing the shunt and series reactances of the above-mentioned $\pi$-elements to form parallel or series resonant circuits tuned to the average operating frequency. To this end, the capacitances $C'+C/2$ of FIGURE 6 have inductances $L_{61}$ and $L_{34}$, respectively, connected in parallel, while the inductance $L_1$ of FIGURE 6 has a capacitor $C_1$ serially connected with it. In FIGURES 6 and 7, the distributed inductance and the distributed capacitance of the first coaxial line $LK'_{13}$ are represented by the equivalent circuit components L' and C'.

By virtue of the above teaching, which allows the bridge to be complemented to form filters which are independent of frequency, it is possible to obtain matching over a sufficiently large frequency range. However, it is often undesirable that, after the reactive components have been compensated for, the ohmic load resistance for generator $G_1$ is equal to $R/2$ while the corresponding load resistance for generator $G_2$ is equal to 2R. However, the circuit arrangement according to the present invention can be modified so that this drawback, too, is eliminated, and so that load resistance is the same for both generators.

This is shown in FIGURE 8 in which the impedances in all four arms are equal to each other. Each arm has an ohmic resistance equal to R in parallel with an inductance equal to L. The bridge is thus symmetrical with respect to its two diagonals. If the output voltages of generators $G_1$ and $G_2$ are adjusted so as to be of the same phase, the equal currents caused by the two generators (one arrow head representing the current due to $G_1$ and two arrow heads representing the current due to $G_2$) will cancel each other in the arms containing the compensating resistances $B=R$ but be additive in the arms, containing the load resistances $A=R$, so that the sum of the power outputs of the two generators $G_1$ and $G_2$ will be distributed evenly between the output resistances A. These resistances can, therefore, be at least partly formed by the input resistances of two cooperating antenna parts, preferably two components of a cross-type antenna, or two adjacent dipoles of a symmetrical so-called fishbone aerial. This is again shown symbolically in FIGURE 8. Inasmuch as the voltages across the output resistances of FIGURE 8 are likewise of the same phase, the line leading to one of the two cooperating antenna components, in the case of a cross-type antenna, has to be longer than the other so as to obtain a 90° phase shift, unless, of course, a different dipole characteristic is desired.

The arrangement of FIGURE 8 is not limited to the provision of inductances across the ohmic resistors. Instead, the parallelly connected elements can be resonant circuits. To be borne in mind, of course, is that, in accordance with the basic concept disclosed herein, at least a portion of the reactances, particularly in the arms adjacent point I, or at least one of them, are constituted by the outer conductor of a coaxial line.

FIGURE 9 shows the equivalent circuit of the load, as seen by generator $G_1$, appearing across points I and II of the bridge of FIGURE 8. This load is constituted by a parallel circuit one branch of which is an ohmic resistance equal to R and the other branch of which is an inductance equal to L. It is true that the load resistance for $G_1$ is therefore dependent on frequency, but the circuit can, in the same manner as FIGURE 5, be complemented by additional components to form an $\pi$-element which is independent of frequency. Accordingly, the circuit of FIGURE 9 also includes a serially connected capacitance $C_2$ positioned between the point II and the upper terminal of generator $G_1$, as well as a shunt inductance equal to L which is parallel with the generator.

FIGURE 10 shows the equivalent circuit of the load, as seen by generator $G_2$, appearing across the points III and IV. This equivalent circuit is constituted by a parallel circuit made up of the ohmic resistance R and the inductance L. The load resistances for the two generators are equal to each other due to the symmetry of the bridge. The distributed inductance and the distributed capacitance of the coaxial line $LK'_{13}$ which connects the generator $G_2$ are represented by the lumped capacitances L' and C'. The bridge circuit is completed to form a frequency independent $\pi$-element by means of a series capacitance $C_3$ connected between points V and VI and a shunt inductance L connected across points VI and I.

Figure 11:
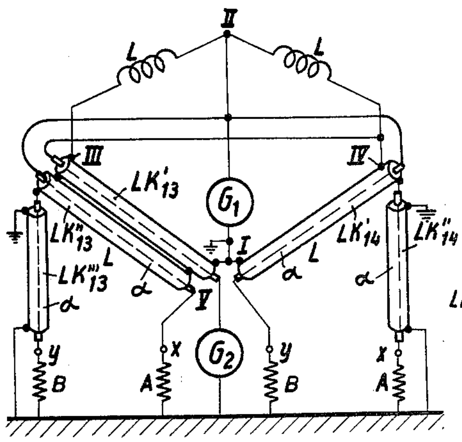
FIGURE 11 is a circuit diagram of another embodiment of a bridge according to the present invention.

FIGURE 11 shows a further development of the bridge circuit of FIGURE 8, by means of which it is possible not only to ground one terminal of generator $G_2$, as shown in FIGURE 2, but also to ground the ohmic resistances in the arms adjacent point II. This produces the totally unexpected result that the resistances in opposite arms—namely, the two load resistances on the one hand and the two compensating resistances on the other—can be combined with each other without disturbing the symmetry or operation of the bridge. This produces a circuit which is the electrical equivalent of FIGURE 8, wherein the reactive components are represented by elements which are physically incorporated in the branches, while the ohmic components are formed simply by two elements both of which are grounded and which are electrically effective in two mutually opposite arms of the bridge.

FIGURE 11 shows the bridge points I, II, III, and IV which correspond to the similarly referenced points in the circuit of FIGURE 8. As was the case in FIGURE 2, a first coaxial line $LK'_{13}$ is used for grounding one output terminal of generator $G_2$. For purposes of clarity of illustration, the coaxial line is not shown coiled but straight, it again being noted, however, that the outer conductor of this coaxial line constitutes the bridge inductances L in I–III. The same thing is done to allow the load resistance A of FIGURE 8, lying between II and III, to be grounded at one end. For this purpose, a second coaxial line $LK''_{13}$ is provided whose outer conductor has its ends connected with the ends of the first coaxial conductor $LK'_{13}$, and whose inner conductor is connected with II at that end of the line at which the outer conductor is connected with III, while the other end of this inner conductor, namely the end at that end of the line at which the outer conductor is connected to ground, is connected with one terminal of the resistance A lying in the arm between points II and III. The other terminal of this resistance A is grounded.

Similarly, the load compensating resistance $B=R$ contained in the arm between II and IV can have one of its ends grounded. Just as in branch I, III, one of the two unilaterally grounded inductances was replaced by the outer conductor of the coaxial line, so is the other of these inductances, in FIGURE 11, replaced by the outer conductor of a coaxial line, namely, line $LK'_{14}$ whose inner conductor is connected with II at that end of the line at which the outer conductor is not grounded, and connected with one terminal of the ohmic resistance $B=R$ at that end of the line at which the outer conductor is grounded; the other terminal of this resistance B is grounded. This produces, in principle, the bridge of FIGURE 8, in which each of the two generators as well as one terminal of each of the resistances is grounded.

FIGURE 11 shows that the output resistance A between II and III and the compensating resistance B between II and IV are connected, by means of coaxial lines having a phase angle $\alpha$, with those points of the bridge at which they are to be effective. In order to maintain the symmetry, therefore, the two ohmic resistances equal to R in the lower bridge arms must likewise be connected via coaxial lines of corresponding electrical lengths. The latter are grounded at one side, due to the fact that point I is grounded. The circuit thus includes a fourth and a fifth coaxial line $LK'''_{13}$ and $LK''_{14}$. The outer conductors of these coaxial lines are grounded, but they can not be inductively coupled with the outer conductors of those coaxial lines which form the inductances L of the two lower bridge arms. These coaxial lines $LK'''_{13}$ and $LK''_{14}$ are therefore shown separately in FIGURE 11. Actually, FIGURE 11 is drawn so that the positions of the various components correspond to the posiitons of the corresponding components in FIGURE 8 so as more easily to compare these two figures, it being understood, however, that, in practice, the spatial arrangement of the parts will have to be selected on different bases.

A consideration of the basic bridge of FIGURE 8 has already shown that, in normal operation, the voltages appearing at the output terminals of output resistances A will be equal to each other and of the same phase. At the same time, the currents in the compensating resistances B will cancel each other, so that, during normal operation, the voltage across the compensating resistances will be equal to zero. Should, however, one of the two generators, say, generator $G_2$, fail, and if the bridge is then fed solely by the remaining generator $G_1$, the remaining output of this generator distributes itself equally over the two bridge arms between I and III, so that there will appear across all of the resistances equal voltages of the same phase. In both cases, i.e., in normal operation with two generators working and in the abnormal case where only one generator is working, the voltages across the output resistances A will be equal to each other and of the same phase, the same holding true for the voltages across the compensating resistances B.

It will thus be seen from FIGURE 11 that the upper terminals *x, x,* of the output resistances A and the upper terminals *y, y,* of the compensating resistances B will, under all operating conditions, be equal to each other and have equiphase instantaneous potentials with respect to ground. Therefore, the points *x, x,* on the one hand and points *y, y,* on the other, can be connected with each other. The ohmic resistances in the four bridge arms can thus be replaced by two resistance elements each having the value $R/2$, so that there is but a single compensating resistor$=R/2$. By the same token, the input resistance of the antenna taking the place of resistance A, or the input resistance of the line connecting the antenna with the bridge, must be likewise$=R/2$. If the resistance of the antenna, or the line connecting the antenna with the bridge is not equal to $R/2$, a transformer arrangement of appropriate band width can be connected to the output side of the bridge, in a manner well known in the art. For example, the transformer can be constituted by quarter wave length conductors. If a two-stage or three-stage transformer of this type is used, proper matching over a sufficiently broad frequency band can be obtained.

Figure 12:
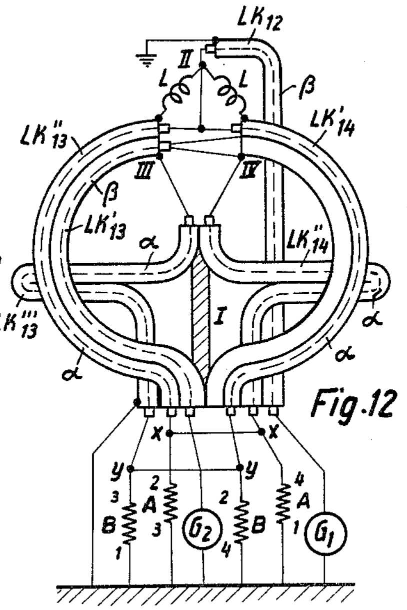
FIGURE 12 is a circuit diagram of yet another embodiment of a bridge according to the instant invention.

FIGURE 12 shows a bridge arrangement in which the points *x, x,* and *y, y,* are connected with each other. Also, the coaxial lines constituting the inductances L in the two lower bridge arms are shown curved, so that the two bridge points III and IV are physically next to each other. In order to compensate for the phase error which results from the feeding of the output voltage of generator $G_2$ via the first coaxial line $LK'_{13}$, the output voltage of generator $G_1$ is also fed to the bridge via a coaxial line $LK_{12}$ which has the same electrical length $\beta$ as the line $LK'_{13}$. This coaxial line for the generator $G_1$ is the sixth coaxial line of the arrangement. In FIGURE 12, the inductance L in the arm between I and III is constituted by parallelly extending and contiguous coaxial lines $LK'_{13}$ and $LK''_{13}$. In order to maintain the spatial symmetry, the outer conductor of line $LK'_{14}$ between I and IV has another outer conductor next to it which is coextensive with and contiguous to coaxial line $LK'_{14}$. This outer conductor is an empty one, in that it lacks an inner conductor.

The coaxial lines $LK'''_{13}$ and $LK''_{14}$ are, in FIGURE 12, shown as being folded over each other, it being expressly pointed out that their outer conductors must not be coupled with the outer conductors of the inductances of the two lower bridge arms. FIGURE 12 is an illustration of an actual embodiment of a bridge shown diagrammatically in FIGURE 11, from which it will be seen that the outer conductors of all coaxial lines can have their one ends arranged next to each other, at which point they are grounded. This ground at the same time constitutes point I of the bridge. As is known, the capacitative and inductive reactances, as well as series and parallel resonant circuits made up of such reactances, can be constituted by appropriately designed coaxial line sections whose ends are either open or short-circuited. If the electrical length of these coaxial line sections differs substantially from integral multiples of the quarter wave length, capacitative or inductive reactances will appear at the ends of the sections. If the electrical length is equal to an integral multiple of the quarter wave length, the section will be a series or parallel resonant circuit. In practice, such coaxial line sections can be used in the individual bridge arms to constitute the reactances or combination of reactances. This is particularly expedient if the bridge is to be used in conjunction with short waves or ultrashort waves. In this way, then, not only can the inductances L be constituted by the outer conductors of coaxial line sections, but reactances composed of L and C components can be constituted by parallel or series resonant circuits. Inasmuch as the outer conductors of the coaxial line sections, by means of which the various inductances are formed, are also used to accommodate inner conductors which serve to establish certain connections in the bridge, it is necessary that, if the inductances are constituted by coaxial line sections, these outer conductors appear as inner conductors of such coaxial sections. There is, therefore, a nesting of coaxial lines. According to a further feature of the present invention, therefore, the inductances are constituted not just by the outer conductors of coaxial lines, but by appropriately dimensioned coaxial line sections whose inner conductors are the outer conductors of the first and third coaxial lines ($LK'_{13}$ and $LK'_{14}$) which are used as the means for forming the reactances in the arms next to point I, as well as the outer conductors which are used to form the reactances in the arms next to point II. This is shown in FIGURE 13 which illustrates a practical embodiment of the arrangement of FIGURE 12 and is especially adapted for use with ultrashort waves.

Figure 13:
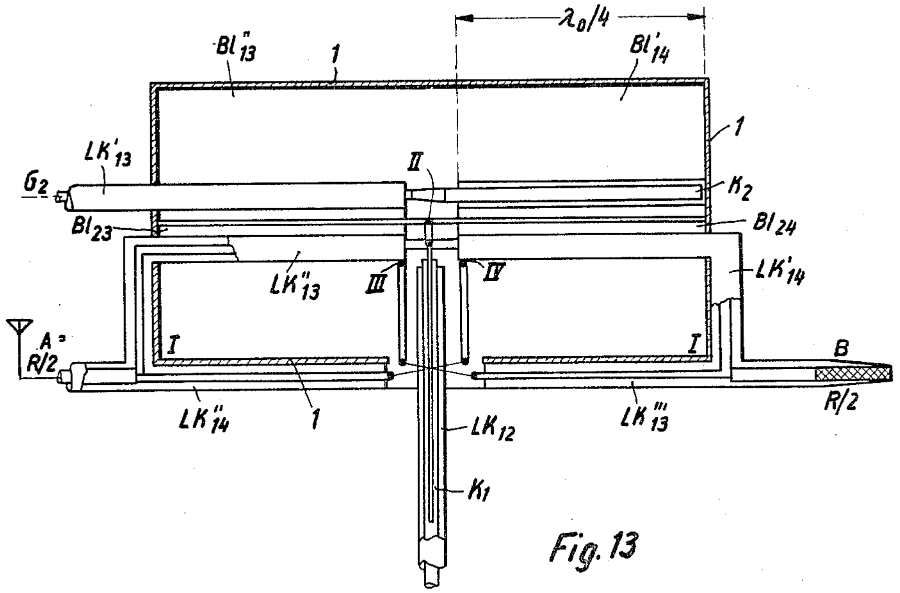
FIGURE 13 shows a practical embodiment of a bridge according to the present invention.

FIGURES 13 shows a box having walls 1 which enclose substantially all of the electrical components. The box constitutes a symmetrical tank circuit at whose physical center lies point II of the bridge. The coaxial sections which constitute the reactances of the bridge arms extend from the center to the walls 1. The reactance between points I and III, and the reactance between points I and IV, are each formed by the wall together with the outer conductor of a further coaxial line section and at least one of the mentioned coaxial lines on each side of the center of the box. Here, a coaxial line section is intended to refer to an open or short-circuited coaxial section of such length that it forms the reactance, or combination of reactances, of the respective arm. The coaxial line sections $B1''_{13}$ and $B1'_{14}$ are thus formed by the two sets of outer conductors which extend from the center of the box in opposite direction to the walls, together with the walls, and represent the reactances of bridge arms I, III, and I, IV. Each of these sections is a section short-circuited at one end and having an electrical length $\lambda_0/4$, $\lambda_0$ being a wave length corresponding to the middle or average frequency of the operating frequency range. As is well known, the short-circuited end of a quarter wave length coaxial line becomes a very large resistance at the input, so that this component has the characteristics of an anti-resonant or rejector circuit. The two sections thus act as if there were included in each of the bridge arms I, III, and I, IV, an anti-resonant circuit tuned to the average frequency of the operating frequency band, which circuit is in parallel with the ohmic resistance of the particular bridge arm.

For reasons of symmetry, similar anti-resonant circuits are incorporated in the bridge arms II, III, and II, IV.

Therefore, each of the two sets of outer conductors on both sides of the center of the box has such a conductor which, together with the respective inner conductor on each side, forms a further short-circuited quarter wave length section. The latter are indicated at $Bl_{23}$, $Bl_{24}$. Their inner conductors emanate from point II, which is as it should be in view of their position in the bridge. The ends of their outer conductors are, at the open side, connected with points III and IV, respectively.

Also emanating from point II are the inner conductors of coaxial lines $LK''_{13}$ and $LK'_{14}$, which correspond to the similarly referenced coaxial lines shown in FIGURE 12. Their outer conductors extend, to the point where they penetrate the walls 1, within the two above-mentioned sets of conductors.

Within a set of preferably contiguous outer conductors there is the outer conductor of the first coaxial line $LK'_{13}$, which is located on one side of a plane of symmetry passing through the center of the box, which line, after penetrating the lateral wall 1 runs into the high frequency line coming from generator $G_2$. Arranged in symmetry with this outer conductor of line $LK'_{13}$ and located on the other side of this plane of symmetry is a coaxial line section $K_2$ which has a length $\lambda_0/4$ and is open at one end, this last-mentioned line being connected in series between the end of the first coaxial line $LK'_{13}$ and the fourth point IV of the bridge. The coaxial line section $K_2$ has the characteristics of a series resonant circuit tuned to the average frequency $f_0$, so that for this frequency its input is a short circuit. The line section will thus present capacitative and inductive reactances for above and below $f_0$, so that this section serves to produce the desired compensation.

The sixth coaxial line $LK_{12}$ to the generator $G_1$ is at right angles to the set of preferably contiguous outer conductors and is so arranged that its axis lies in the plane of symmetry of the box. In this way, there will be no inductive coupling of this line with the set of outer conductors, which themselves form the inner conductors of the tank circuit.

The fourth coaxial line $LK'''_{13}$ and the fifth coaxial line $LK''_{14}$ have those parts which are next to the points III and IV extend at right angles to the set of outer conductors. These parts are preferably parallel to the sixth coaxial conductor $LK_{12}$ as they pass out through the box; these lines $LK'''_{13}$ and $LK''_{14}$, once outside the box, are connected with the third coaxial line $LK'_{14}$ and the second coaxial line $LK''_{13}$, respectively, as well as with high frequency lines leading to the compensating resistance B and the load resistance A, respectively. In FIGURE 13, the cross-over of the coaxial lines $LK''_{14}$ and $LK'''_{13}$ within the box is shown schematically. In practice, of course, the lines would come out of the plane of the drawing and thus pass past each other.

The line connecting generator $G_1$ is provided with a coaxial line section $K_1$ which has the same compensating effect on that connection as coaxial line section $K_2$ has on the connection from generator $G_2$. The coaxial line section $K_2$ is accommodated within the inner conductor of the sixth coaxial line $LK_{12}$ and is, electrically, a quarter wave length line section having an open end, the inner conductor of which is connected with II. In this way, the resistance appearing at the input end has the characteristics of a series resonant circuit tuned to the average operating frequency, which resonant circuit is effective as a series-connected element in the connection from generator $G_1$ between points I and II. In lieu of obtaining compensation by means of the quarter wave length open line section a half wave length long line section of given characteristic impedance can be incorporated in the connection from generator $G_2$, in which case the input of the open quarter wave length coaxial line has to be short-circuited.

The characteristic impedances of the individual coaxial lines and coaxial sections are so selected as to avoid reflection at the junctures, in a manner well known in the art. FIGURE 13 shows the approximate characteristic impedances by the ratio of diameter of the inner conductor to the respective outer conductor, as, for example, at the junction of coaxial lines $LK''_{13}$ and $LK''_{14}$, in which they merge into the line leading to the load resistance $A=R/2$. The characteristic impedance of this high frequency line must, for matching purposes, be equal to $Z=R/2$, while the characteristic impedances of the coaxial lines running into this line must each be equal to R.

The above circuit arrangement can be inverted, i.e., the input and output can be exchanged. Insofar as the embodiment of FIGURE 12 is concerned, this means that the circuit will operate if, for example, the combined output resistance A is constituted by a receiving antenna and if the currents are to be distributed to two loads connected to $G_1$ and $G_2$. These loads can, in the assumed case, be radio receivers. The energy coming from the receiving antenna is then applied to the two loads, the currents being of equal phase and amplitude. Such arrangements, too, make full use of the fact that the circuit according to the present invention is substantially independent of frequency.

Thanks to the features shown in FIGURES 8 through 13, wherein the resistances in the two bridge arms are combined into a single element, it is now, for the first time, possible to superimpose, in the short wave and ultrashort wave region and using a bridge circuit with equiphase voltages at the connections of generators, frequency ranges whose limit frequencies are at a ratio of 1 to 3.5. Heretofore such frequency bands could be handled by prior art bridge circuits only if the phases of the two generators are 90° apart. There are many applications, however, for which such bridges are not suitable. For example, in the case of keyed transmitters operating with weakly damped antennas, there will be different loads on the two transmitters during the initial transient stages of the operation. Nor can such bridges having input voltages which are 90° apart be used for connecting the outputs of chain amplifiers in parallel. It has been shown that the number of tubes in a power chain amplifier could not be increased beyond a certain limit, so that for obtaining increased power outputs, such amplifiers have to be connected in parallel. The bridge circuits according to the present invention are exceptionally well suited for effecting such coupling.

It will be seen from the above that the very significant advantage of the bridge circuit according to the present invention is that it provides a decoupling which is independent of frequency, that there is no loss in the compensating resistance, and that excellent matching is obtained within practically any desired frequency range.

The mutual coupling of the inductances in the opposite bridge arms enlarges the useful frequency range within which the bridge may operate, as will now be explained. The limit of the usable frequency range is, at low frequencies, fixed by the requirement that the inductive reactance of the inductances L of FIGURE 8 which lie in parallel with the ohmic resistances R of the bridge arms, particularly the inductive reactance of a coil formed by a coaxial line, must, in order to make possible a $\pi$-compression with small input characteristic impedance, be large with respect to the ohmic resistance of the arm. At high frequencies, the limit is fixed by the characteristic impedance of the inductance coils which, in the case of a coil constituted by a coaxial line section, depends mainly on the coiled cable length. If the frequency range is to be increased, it would therefore be desirable to obtain as high an inductive resistance as possible with as short a coiled cable length as possible. A reduction in the cable length to be wound has the additional advantage that the costs of the circuit would be reduced because the cables needed for large power outputs are very expensive. In the case of lower power requirements, for example in portable equipment, space requirements and weight are the important factors.

Figure 14:
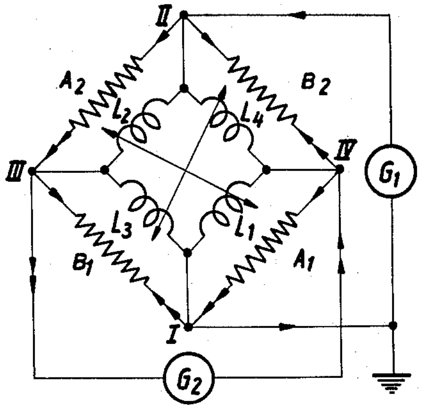
FIGURE 14 is a circuit diagram of a bridge similar to that of FIGURE 8 but having opposite inductances mutually coupled.

FIGURE 14 shows a circuit arrangement which corresponds to that of FIGURE 8 except that the opposite inductances are mutually coupled, as indicated by the arrows. The bridge arms I, IV, and II, III, contain the two parts of the load resistances $A_1$ and $A_2$ which, in the manner explained above, can be combined with each other. The other bridge arms contain the compensating resistances $B_1$ and $B_2$. All of the ohmic resistances in the bridge arms are equal to R. The inductances $L_1$, $L_2$, $L_3$ $L_4$, contained in the respective bridge arms are all equal to L.

FIGURE 14 shows the instantaneous currents flowing if the high-frequency generators deliver equiphase voltages, there being one arrow head to show the current from generator $G_1$ and two arrow heads to show the current from generator $G_2$. As is apparent, the partial currents resulting from the two generators $G_1$, $G_2$ must, for reasons of symmetry, be equal to each other in all arms of the bridge. As indicated by the arrow heads, the currents in the arms containing resistances $B_1$ and $B_2$ cancel each other, while these currents are additive in the arms containing the load resistances $A_1$, $A_2$. Here the inductances connected in parallel with the ohmic resistances can be ignored. If the polarity of one of the generators is reversed, this simply means that the compensating and load resistances have changed position with each other.

FIGURE 14 also knows that, if the bridge is supplied with voltages of the same or opposite phase, the currents flowing in opposite bridge arms will always be the same, irrespective of whether only one generator or both generators are in operation. This equality of the currents allows the inductance coils in the opposite arms to be magnetically coupled with each other without this having any effect on the equilibrium of the bridge. This coupling of inductances $L_1$, $L_2$, and $L_3$, $L_4$, is indicated by the arrows. Nor will this mutual coupling disturb the decoupling condition between the two bridge diagonals.

Assuming now only generator $G_1$ to be connected to the bridge (across points I and II), it will be seen that, due to the fact that the four ohmic resistances are equal to each other, the potentials at III and IV will be the same. All that has to be considered then, is whether the mutual coupling of opposite coils disturbs the balancing of the bridge. To this end, reference is made to FIGURE 15 in which the coils are shown without their parallel resistances. The references and subscripts indicated outside of parentheses represent the circuit if only generator $G_1$, connected across points I and II, is operative, while the references and subscripts indicated within parentheses represent the circuit if only generator $G_2$, connected across points III and IV, is operative. It will be appreciated that the currents $I_1$ and $I_2$ of the two parallel paths shown in FIGURE 15 must be equal to each other because these two paths are exactly alike. Hence $I_1=I_2=I$. The voltage V across the generator, shown in FIGURE 15, can thus be expressed as follows:

$$V=I\cdot\omega(2L+2M)=2I\cdot\omega L(1+k)$$

wherein M is the mutual inductance between two coupled together coils and $k$ is the corresponding coupling factor. The effective inductance of each bridge arm is increased to $L(1+k)$.

Figure 15:
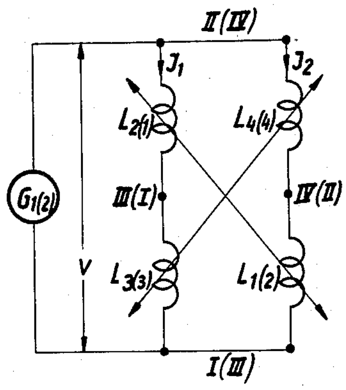
FIGURE 15 is a simplified circuit diagram of the bridge of FIGURE 14 and is referred to for purposes of explanation.

If, in FIGURE 15, the voltage across points II and III is $V_{23}$ and the voltage across points II and IV is $V_{24}$, the following relationship will prevail:

$$V_{23}=I\omega(L+M)=I\omega L(1+k)=V_{24}$$

The voltage $V_{34}$ across points III and IV is therefore $$V_{34}=V_{23}-V_{24}=0$$

This proves that the points III and IV are at the same potential with respect to the voltage of generator $G_1$ and that points I and II are at the same potential with respect to generator $G_2$. This can also be concluded directly from the symmetry of the circuit.

In a practical embodiment, the coupling factor between inductances lying in the opposite arms can be made to equal at least 0.7. As a result, the inductances in the arms are increased by a ratio of 1:1.7 without increasing the size of the coils. Conversely, the coils can be reduced in size, by a corresponding factor of 0.59, without there being any decrease in the effective inductance, i.e., by mutually coupling the inductances in the opposite arms of the bridge, the inductance coils can be smaller than if they were not so coupled. Since the coils are constituted by coaxial lines, the length of these lines can be reduced which additionally reduces the characteristic wave length to about 0.77 of the original length, which means that the frequency range of the bridge is increased by a factor of 1.3.

Figure 16:
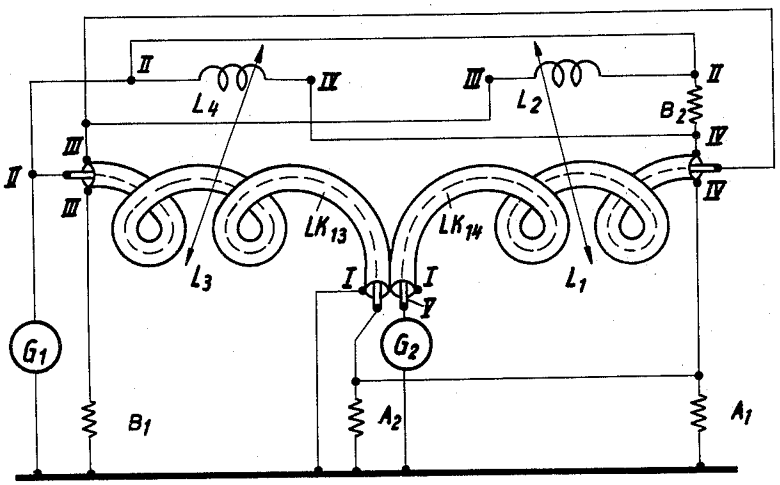
FIGURE 16 is a circuit diagram of a bridge according to the present invention, based on the bridge of FIGURE 14.

FIGURE 16 shows another embodiment of the present invention based on the circuit shown in FIGURE 14. In order that one of the terminals of generator $G_2$ may be grounded, the inductance $L_1$ is constituted by the outer conductor of a first coiled coaxial line $LK_{14}$. The other, non-grounded terminal of generator $G_2$ is connected with point III via the inner conductor of the first coaxial line, the latter being matched. The terminal voltage of generator $G_2$ appears at the end of the coiled coaxial line between the inner and outer conductors, so that this generator is thus connected between points III and IV. Similarly, the inductance $L_3$ of FIGURE 14 is constituted by a second coiled coaxial line $LK_{13}$. One terminal of the load resistance $A_2$ is grounded via the inner conductor of this second coaxial line, so that this resistance can be connected directly in parallel with, or be combined with, the already grounded load resistance $A_2$.

If the inductance $L_1$ is formed by two parallelly connected coiled coaxial conductors, one terminal of the compensating resistance $B_2$ could be grounded. However, the circuit of FIGURE 16 does not make use of this possibility, because in low or medium power transmitters, it often does not make any difference whether or not both terminals of the compensating resistance are at a potential with respect to ground. The mutual coupling of coils $L_1$, $L_2$, and $L_3$, $L_4$, is indicated by the arrows. Inasmuch as only coils $L_1$ and $L_3$ need be fashioned as coiled coaxial lines, it is possible to arrange the coils $L_2$ and $L_4$ physically within coils $L_1$ and $L_3$, respectively, so that the coupling factors between the coupled coils will be very high.

Figure 17:
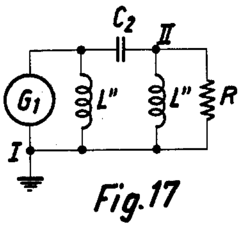
FIGURE 17 is an equivalent circuit diagram of the bridge of FIGURE 16 taken across points I and II, complemented by shunt and series elements to form a filter network.
Figure 18:
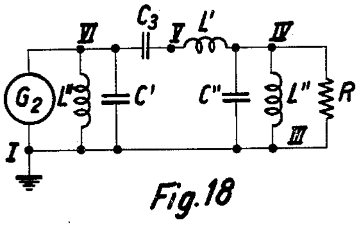
FIGURE 18 is an equivalent circuit diagram of the bridge of FIGURE 16 taken across points III and IV, complemented by shunt and series elements to form a filter network.

FIGURES 17 and 18 show how the bridge of FIGURE 16 can be complemented to form compensated filter elements which are independent of frequency with respect to the connection of the two generators, so that the reactive components, which without additional circuitry would appear at the generator connections, will be virtually eliminated over a wide operating frequency range. The ohmic components of the bridge input impedances constitute the terminal resistances of the filters. The parts which complement the bridge to form the filter thus allow the matching of the generators to be maintained over a large operating frequency range.

As shown in FIGURE 17, the resulting input impedance of the bridge between I and II can be represented by a parallel circuit comprising an ohmic resistance equal to R and an inductance equal to L″, where $R=A_1=A_2=B_1=B_2$, and $L''=(1+k)$. If the generator $G_2$ were connected directly to the points I, II, the load resistance constituted by the bridge would, in some cases, not be sufficiently independent of frequency. The bridge is there complemented to form a $\pi$-element which is sufficiently independent of frequency by providing a shunt inductance equal to L″ between the output terminals of the first generator $G_1$ and a series capacitance $C_2$ between the non-grounded terminal of the first generator and the point II.

Inasmuch as the bridge of FIGURE 16 is symmetrical with respect to the connection with generator $G_2$ except for the connection of this generator via the first coaxial line $LK_{14}$, the input impedance of the bridge, as seen across III, IV, can be represented by a parallel circuit comprising R and L'', so that the reactive impedance components can be compensated for in basically the same way as was explained in connection with FIGURE 17 insofar as the connection of generator $G_1$ is concerned. The bridge circuit is thus complemented to form a $\pi$-element which is frequency independent in the operating frequency range of generator $G_2$, by the series capacitance $C_3$ arranged between the terminal of generator $G_2$ which is to be connected with the inner conductor of the first coaxial line $LK_{14}$ and the end point V of this inner conductor, and by a shunt inductance equal to L'' which is connected in parallel with generator $G_2$. The shunt capacitance C' in FIGURE 18 represents the equivalent capacitance C'' of the coaxial line $LK_{14}$, whose equivalent series inductance is indicated at L'. These lumped equivalent values represent the distributed reactance and susceptance of the coaxial line $LK_{14}$.

It will be understood that the above description of the present invention is susceptible to various modifications, changes, and adaptations, and the same are intended to be comprehended within the meaning and range of equivalents of the appended claims.

What is claimed is:

1. A circuit arrangement for feeding a common load from first and second high-frequency generators whose output voltages are of the same frequency and bear a predetermined phase relationship to each other, said circuit arrangement comprising a four-arm bridge having first and second points located at the ends of one bridge diagonal and third and fourth points located at the ends of the other bridge diagonal, (a) said first point being connected with
  (1) one output terminal of said first generator,
  (2) one terminal of a load resistance lying in one of the two bridge arms terminating at said first point,
  (3) one terminal of a load compensating resistance equal to said load resistance and lying in the other bridge arm terminating at said first point, and
  (4) ground;

(b) said second point being connected with
  (1) the other output terminal of said first generator,
  (2) one terminal of a first impedance lying in one of the two bridge arms terminating at said second point, and
  (3) a second impedance lying in the other of the two bridge arms terminating at said second point;

(c) said third point being connected with
  (1) the other terminal of said compensating resistance, and
  (2) the other terminal of said first impedance;

(d) said fourth point being connected with
  (1) the other terminal of said load resistance, and
  (2) the other terminal of said second impedance;

(e) first and second reactance means connected across said resistances, respectively;

(f) at least a portion of one of said reactance means comprising the outer conductor of a coaxial line so that said outer conductor is at one end connected to said first point and hence grounded and connected at the other end to said other terminal of the resistance across which said one reactance means is connected;

(g) the inner conductor of said coaxial line being connected, at that end of the coaxial line at which said outer conductor thereof is connected with the point at which is located said other terminal of said last-mentioned resistance, with the point at which is located said other terminal of the other of said resistances; said inner conductor being connected, at that end of the coaxial line at which said outer conductor thereof is grounded, with one output terminal of said second generator; and (h) the other output terminal of said second generator being grounded, whereby the output voltage of said second generator is effective, via said coaxial line, across said third and fourth points while allowing both of said generators to be grounded.

2. A circuit arrangement as defined in claim 1 wherein each of said first and second reactance means comprises an inductor equal to L, and wherein each of said first and second impedances comprises a capacitor equal to C; said circuit arrangement further comprising an inductor $L/2$ connected across said first and second points thereby to form a $\pi$-element which, within the operating frequency range of said first generator, is independent of frequency.

3. A circuit arrangement as defined in claim 1 wherein each of said first and second reactance means comprises an inductor equal to L, and wherein each of said first and second impedances comprises a capacitor equal to C; said circuit arrangement further comprising a series inductance interposed between the generator-end of said inner conductor and said one output terminal of said second generator, and a shunt capacitor $C/2$ connected across the output terminals of said second generator thereby to form a $\pi$-element which, within the operating frequency range of said second generator, is independent of frequency.

4. A circuit arrangement as defined in claim 1 further comprising resonant circuit means which are series and shunt connected with said generators and tuned to the middle frequencies thereof for forming $\pi$-elements which, within the operating frequency range of said generators, are independent of frequency.

5. A circuit arrangement as defined in claim 1, further comprising reactance means for complementing said bridge circuit to form a frequency-independent $\pi$-element, the voltages applied to said bridge circuit by said first and second generators being phase-shifted by 45°.

6. A circuit arrangement as defined in claim 1 wherein each of said first and second impedances comprises a parallel circuit one branch of which is a resistance R equal to said load and compensating resistances, and a second branch of which is an inductor L, there thus being a total of four equal resistances in said bridge; wherein the voltages supplied by said first and second generators are of the same phase; and wherein two of the four resistances lying in two mutually opposite arms of the bridge constitute load resistances and the two remaining resistances lying in the other two mutually opposite arms of the bridge constitute compensating resistances.

7. A circuit arrangement as defined in claim 6 wherein said load resistances are constituted at least in part by two cooperating antenna components.

8. A circuit arrangement as defined in claim 6, further comprising a second coaxial line whose outer conductor has its ends connected with respective ends of the outer conductor of the first coaxial line, the inner conductor of said second coaxial line being connected, at that end of said second coaxial line at which said outer conductor thereof is connected to said third point, with said second point; the other end of said last-mentioned inner conductor being connected with a terminal of the resistance lying between said second and third points, the other terminal of said last-mentioned resistance being grounded.

9. A circuit arrangement as defined in claim 8 wherein the other of said reactance means is constituted by the outer conductor of a third coaxial line having its ends connected to said first and fourth points, respectively, the inner conductor of said third coaxial line being connected, at that end of said third coaxial line at which said outer conductor is connected to said first point and hence to ground, with a terminal of the resistance lying between said second and fourth points, the other terminal of said last-mentioned resistance being grounded.

10. A circuit arrangement as defined in claim 9 wherein the non-grounded terminals of the two resistances lying between said first and third points and between said first and fourth points, respectively, are connected with said third and fourth points via fourth and fifth coaxial lines whose electrical length is equal to that of said second and third coaxial lines.

11. A circuit arrangement as defined in claim 10 wherein the non-grounded terminals of said load compensating resistances are connected to each other, or are combined into a single resistance equal to $R/2$.

12. A circuit arrangement as defined in claim 10 wherein the non-grounded terminals of said load resistances are connected to eath other, or are combined into a single resistance equal to $R/2$.

13. A circuit arrangement as defined in claim 10, further comprising a sixth coaxial line interposed between said second point and said other output terminal of said first generator, said sixth coaxial line having the same electrical length as said first coaxial line.

14. A circuit arrangement as defined in claim 13 wherein each of said first and second reactance means comprises an inductor equal to L, and wherein each of said first and second impedances comprises a capacitor equal to C; said circuit arrangement further comprising a series inductance interposed between the generator-end of said inner conductor and said one output terminal of said second generator, and a shunt capacitor $C/2$ connected across the output terminals of said second generator thereby to form a $\pi$-element which, within the operating frequency range of said second generator, is independent of frequency.

15. A circuit arrangement as defined in claim 13 further comprising resonant circuit means which are series and shunt connected with said generators and tuned to the middle frequencies thereof for forming $\pi$-elements which, within the operating frequency range of said generators, are independent of frequency.

16. A circuit arrangement as defined in claim 14 wherein said branch inductors are constituted by coaxial line sections whose inner conductors are constituted by the outer conductors of said first and third coaxial lines as well as by the conductors of the inductances in the bridge arms adjacent to said second point.

17. A circuit arrangement as defined in claim 16 wherein the bridge arms comprise capacitative and inductive components forming circuits tuned to anti-resonance at the middle of the operating frequency range.

18. A circuit arrangement as defined in claim 17 wherein said anti-resonant circuits are constituted by short-circuited quarter wave length coaxial line sections.

19. A circuit arrangement as defined in claim 18 and comprising a symmetrical box-shaped tank circuit at whose geometric center said second point is located, the coaxial line sections constituting said reactances extending in opposite directions from said center to the side walls of the tank, the reactances between said first and third points and said first and fourth points being constituted by said side walls and the outer conductors of further coaxial line sections and the outer conductors of the coaxial lines arranged on each side of said center, said sections constituting the reactances between said third and second points and said fourth and second points, said coaxial lines corresponding to said second and third coaxial lines.

20. A circuit arrangement as defined in claim 19 wherein the outer conductor of said first coaxial line is located on one side of a plane of symmetry passing through said center and within a set of other outer conductors and wherein said first coaxial line, after penetrating through the wall of said tank, runs into a high-frequency line coming from said second generator.

21. A circuit arrangement as defined in claim 20, comprising a further coaxial line section having an outer conductor located on the other side of said plane of symmetry, said further coaxial line section being a quarter wave length long, having an open end, and being serially interposed between the end of said first coaxial line and said fourth point.

22. A circuit arrangement as defined in claim 20 wherein said sixth coaxial line extends at right angles to the set of coaxial lines, has its axis located in said plane of symmetry, and, after penetrating through the wall of said tank, runs into a high-frequency line coming from said first generator.

23. A circuit arrangement as defined in claim 20 wherein those parts of said fourth and fifth coaxial lines which are connected with said third and fourth points, respectively, extend at right angles to said set of coaxial lines and parallel with said sixth coaxial line, said fourth and fifth coaxial lines, after penetrating the walls of said tank, being connected with said third and second coaxial lines, respectively, as well as with said load resistance and said compensating resistance, respectively.

24. A circuit arrangement as defined in claim 22 wherein the inner conductor of said sixth coaxial line is hollow, and wherein an open-ended quarter wave length coaxial line section is arranged within said hollow inner conductor of said sixth coaxial line, said coaxial line section having an inner conductor connected with said second point and an outer conductor connected with said side wall of said tank.

25. A circuit arrangement as defined in claim 6 wherein the inductors of opposite bridge arms are mutually coupled with each other.

26. A circuit arrangement as defined in claim 25 wherein the coupling factor $k$ with which opposite inductors are coupled to each other is at least 0.7.

27. A circuit arrangement as defined in claim 26 wherein said inductors have inductance values which are no greater than 0.59 times the inductance values which said inductors would have were they not mutually coupled.

28. A circuit arrangement as defined in claim 25, further comprising a shunt inductance $L''=L(1+k)$ connected between the output terminals of said first generator and a series capacitance interposed between the non-grounded terminal of said first generator and said second point, thereby to form a $\pi$-element which, within the operating frequency range of said first generator, is independent of frequency.

29. A circuit arrangement as defined in claim 25, further comprising a series capacitance between the generator-end of said inner conductor of said first coaxial line and the corresponding terminal of said second generator, and a shunt inductor $L''=L(1+k)$ connected in parallel with said second generator, thereby to form a $\pi$-element which, within the operating frequency range of said second generator, is independent of frequency.

No references cited.

HERMAN KARL SAALBACH, *Primary Examiner.*